United States Patent [19]

Byrne et al.

[11] 4,285,200

[45] Aug. 25, 1981

[54] HYDRAULIC ASSIST TURBOCHARGER SYSTEM

[75] Inventors: Joe L. Byrne, Torrance; Robert J. Kobayashi, Rancho Palos Verdes; James H. Nancarrow, Torrance, all of Calif.

[73] Assignee: The Garrett Corporation, Los Angeles, Calif.

[21] Appl. No.: 57,790

[22] Filed: Jul. 16, 1979

[51] Int. Cl.³ .............................................. F02B 37/10
[52] U.S. Cl. ........................................ 60/607; 60/599
[58] Field of Search ......................... 60/599, 607, 608; 417/407

[56] References Cited

U.S. PATENT DOCUMENTS

| | | | |
|---|---|---|---|
| 2,968,914 | 1/1961 | Birmann | 60/608 |
| 3,099,385 | 7/1963 | Elford | 417/407 |
| 3,389,554 | 6/1968 | Wolf | 60/608 |
| 3,473,322 | 10/1969 | Wolf | 60/607 |
| 3,869,866 | 3/1975 | Timoney | 60/607 |
| 3,921,403 | 11/1975 | McInerney et al. | 60/599 X |
| 3,927,530 | 12/1975 | Braun | 60/607 |
| 4,083,188 | 4/1978 | Kumm | 60/608 X |

FOREIGN PATENT DOCUMENTS 488396  7/1938  United Kingdom ...................... 60/607

Primary Examiner—Michael Koczo, Jr.
Attorney, Agent, or Firm—Stuart O. Lowry; Albert J. Miller

[57] ABSTRACT

A turbocharger system for supplying charge air to a combustion engine includes a nonventilated hydraulic turbine mounted directly on the turbocharger shaft. The nonventilated hydraulic turbine is selectively driven by a high pressure hydraulic fluid to drive supplementally the turbocharger during engine operating conditions when additional air flow to the engine is required.

88 Claims, 9 Drawing Figures

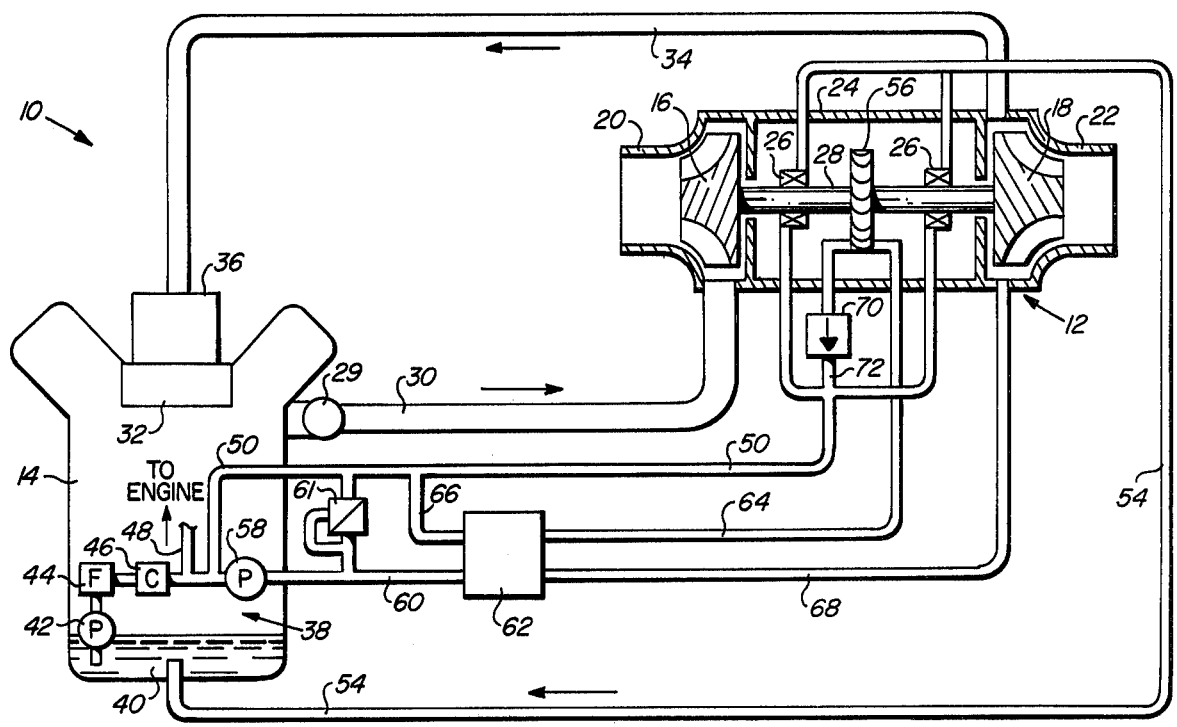
FIG-1
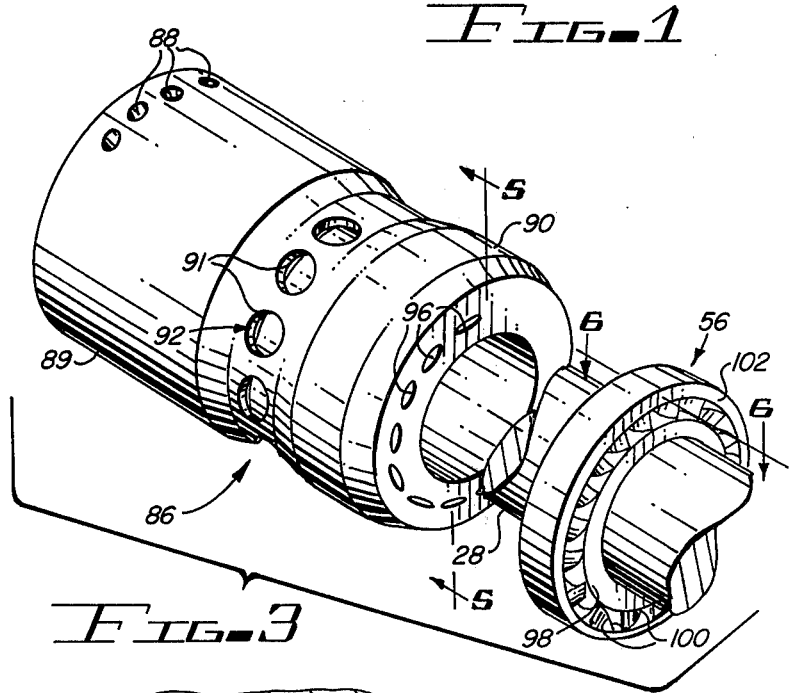
FIG-3
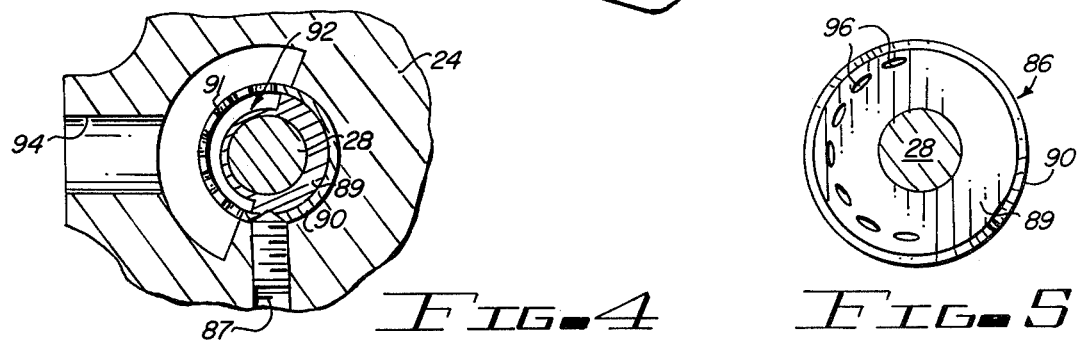
FIG-6
FIG-4
FIG-5

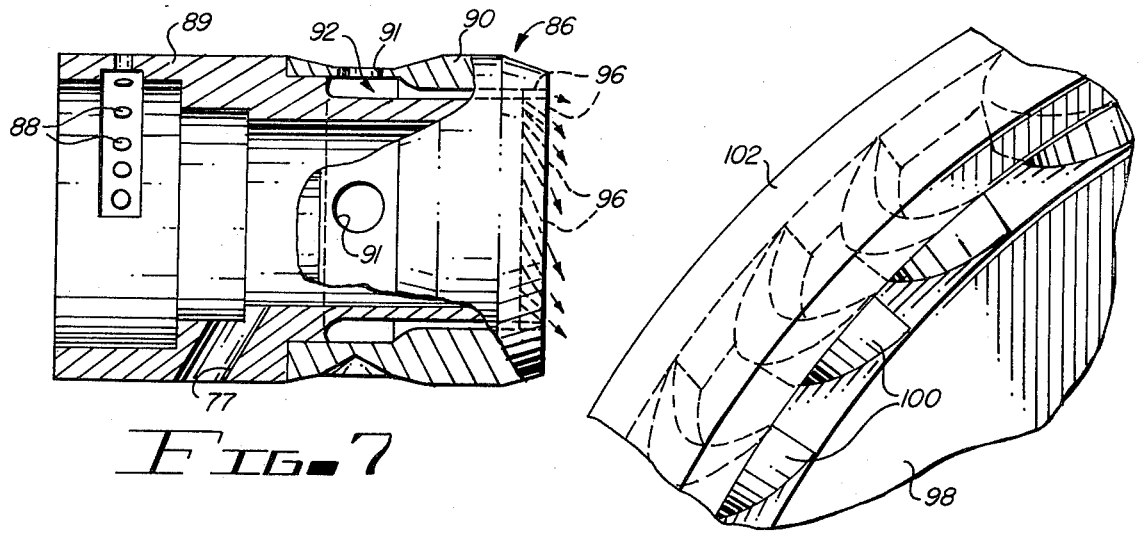
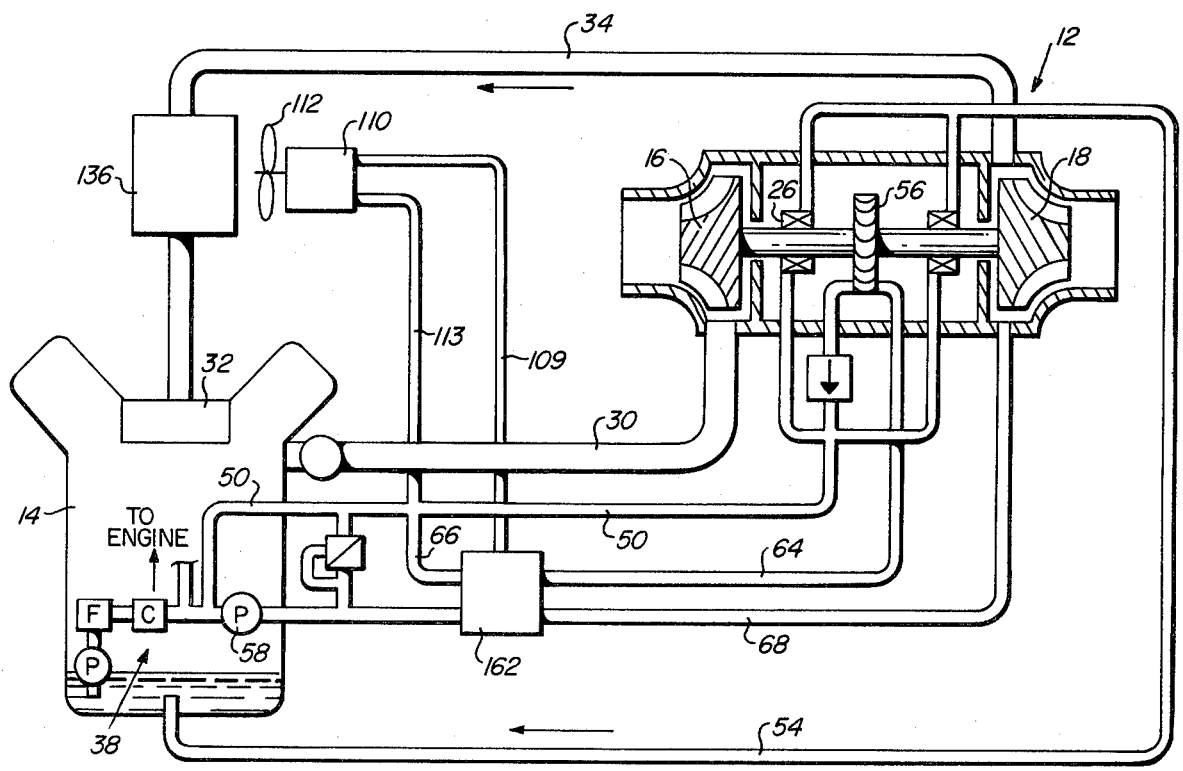

HYDRAULIC ASSIST TURBOCHARGER SYSTEM

BACKGROUND OF THE INVENTION

This invention relates to turbocharger systems for use with combustion engines. More specifically, this invention relates to a turbocharger system including hydraulic assist apparatus and method for supplementally driving the turbocharger at predetermined engine operating conditions.

Turbochargers and turbocharger systems are well known in the art, and typically comprise a turbine wheel and a compressor wheel mounted on a common shaft. The turbine wheel and the compressor wheel are mounted within isolated turbine and compressor housings, which in turn are mounted on a so-called center housing including shaft bearings and lubricant circulation passages. The turbine housing includes a gas inlet and a gas outlet, and is coupled to a combustion engine for passage of engine exhaust gases for rotatably driving the turbine wheel. The rotating turbine wheel correspondingly drives the compressor wheel which compresses ambient air and supplies the compressed air, commonly referred to as a charge air, to the engine.

Turbocharged engines are highly advantageous when compared with conventional naturally aspirated engines in that substantially denser air is delivered to the combustion chamber or cylinders of the engine. This increased air density results in an increased mass flow of available air for combustion to enable the engine to operate at substantially higher performance levels and with greater efficiency. However, an inherent limitation with turbochargers has been their inability to provide to the engine sufficient charge air during some conditions of engine operation. For example, charge air supplied to the engine by the turbocharger during low speed, full load conditions, or during low speed, acceleration conditions typically is insufficient to maintain desired engine performance levels. This inadequate flow of charge air is caused by a relatively low available energy level of engine exhaust gases to drive the turbocharger turbine wheel which in turn drives the turbocharger compressor wheel.

A variety of system concepts are known in the prior art for boosting or supplementing the normal charge air output of a turbocharger during certain engine operating conditions. Some of these concepts relate to auxiliary combustion systems for controllably supplementing the energy level of the exhaust gases with additional combustion energy to supplement driving of the turbocharger. See U.S. Pat. No. 3,988,894 for one example of this type of system. Other system concepts include multiple turbocharger turbine and/or compressor components coupled together, such as those shown by U.S. Pat. Nos. 2,173,595; 2,898,731; 3,005,306; 3,498,052; and 3,355,877. Turbocharger arrangements with supplemental mechanical drives are shown by U.S. Pat. Nos. 2,386,096; 2,578,028; 2,585,029; and 2,585,968, whereas supplemental hydraulic drives are disclosed by U.S. Pat. No. 3,389,554; 3,473,322; 3,921,403; 3,927,530; and 4,083,198. While all of these various system concepts provide at least some supplemental driving of a turbocharger, the relative expense and complexity of these systems has provided a significant obstacle to commercial application. Moreover, mechanically driven and hydraulic motor-driven systems include inherent maximum speed limitations which prevent their use with modern turbochargers including high speed components designed for rotational speeds on the order of about 100,000 R.P.M. or more.

Some prior art system concepts include hydraulic turbines for driving a centrifugal compressor to supply charge air to an engine. In some designs, the hydraulic turbine is embodied in a supercharger system, as in U.S. Pat. No. 3,036,563. In other designs, the system proposes an hydraulic turbine for supplementally driving the turbocharger as through a direct connection to the turbocharger shaft. See U.S. Pat. Nos. 2,968,914; and 3,869,866; and British Pat. No. 488,396. However, these prior art hydraulic turbine systems have included so-called Pelton-type turbine wheels requiring a ventilated chamber for operation. Accordingly, any attempt to operate the Pelton turbine wheels at relatively high rotational speeds results in generation of large quantities of a foamy mixture of air and hydraulic fluid which must be dissipated before recirculation to the turbine wheel or to other system components. This is particularly disadvantageous when the hydraulic fluid is shared with another fluid system, such as an engine lubrication system, in that the foamy mixture does not return rapidly to liquid state, and cannot be used or pumped in foam form for use in the shared fluid system. Moreover, even when free-wheeling with the turbocharger, Pelton-type turbine wheels are not capable of withstanding the high rotational speeds achieved by modern turbochargers. As a result, Pelton-type hydraulic turbine systems have not found commercial application in modern high speed turbocharger environments.

This invention overcomes the problems and disadvantages of the prior art by providing a turbocharger system specially adapted to include a nonventilated hydraulic turbine driven by an hydraulic fluid shared from another hydraulic system for controllably and supplementally driving a turbocharger.

SUMMARY OF THE INVENTION

In accordance with the invention, a turbocharger system comprises a turbocharger having a turbine wheel and a compressor wheel mounted on a common shaft and respectively received within turbine and compressor housings. The turbine and compressor housings are mounted on a center housing including bearings for rotatably supporting the shaft, and lubricant circulation passages for supplying a lubricant such as oil to the bearings. In operation, exhaust gases from a combustion engine rotatably drive the turbine wheel which correspondingly drives the compressor wheel to supply high density charge air to the engine. Conveniently, the engine includes a separate hydraulic system such as a lubrication system including a conventional pump for circulating engine lubricating fluid at relatively low pressure to lubricate engine components. A portion of the fluid from this separate system is used for circulation to the turbocharger center housing to lubricate the turbocharger shaft bearings.

The engine also drives a relatively high pressure fluid pump for providing a source of relatively high pressure hydraulic fluid. The high pressure fluid is coupled through a control valve for selective coupling to a nozzle in the center housing of the turbocharger. When supplied with high pressure fluid, the nozzle directs the high pressure fluid into driving communication with a nonventilated hydraulic turbine mounted on the turbocharger shaft and disposed within a turbine flow chamber in the center housing. The high pressure fluid thus rotatably drives the nonventilated hydraulic turbine and thereby supplementally drives the turbocharger. Importantly, the passage of fluid through the turbine chamber is controlled so that the nonventilated hydraulic turbine runs fully submerged to prevent frothing or foaming of the fluid. Fluid exiting the turbine chamber is return to the engine hydraulic system.

In one embodiment of the system of this invention, the control valve couples the high pressure system fluid back to the engine hydraulic system whenever supplemental driving of the turbocharger is not required. In this manner, the high pressure fluid pump is substantially unloaded. In another embodiment of the invention, the high pressure fluid is coupled to drive hydraulically a fan or the like for forcing cooling air across heat transfer surface areas of a charge air heat exchanger when supplemental driving of the turbocharger is not required.

BRIEF DESCRIPTION OF THE DRAWINGS

The accompanying drawings illustrate the invention. In such drawings:

FIG. 1 is a schematic diagram illustrating the hydraulic assist turbocharger system of this invention;

FIG. 3 is a perspective view, partially exploded, of the hydraulic assist turbine and associated hydraulic nozzle;

FIG. 4 is a reduced fragmented vertical section taken on the line 4—4 of FIG. 2;

FIG. 5 is an end view of the hydraulic nozzle taken on the line 5—5 of FIG. 3;

FIG. 6 is a horizontal section taken on the line 6—6 of FIG. 3;

FIG. 7 is an enlarged fragmented vertical section of the hydraulic nozzle of FIG. 3;

FIG. 8 is an enlarged fragmented perspective view of a portion of the hydraulic turbine; and FIG. 9 is a schematic diagram illustrating an alternate arrangement of the invention.

DETAILED DESCRIPTION OF THE PREFERRED EMBODIMENT

Figure 2:
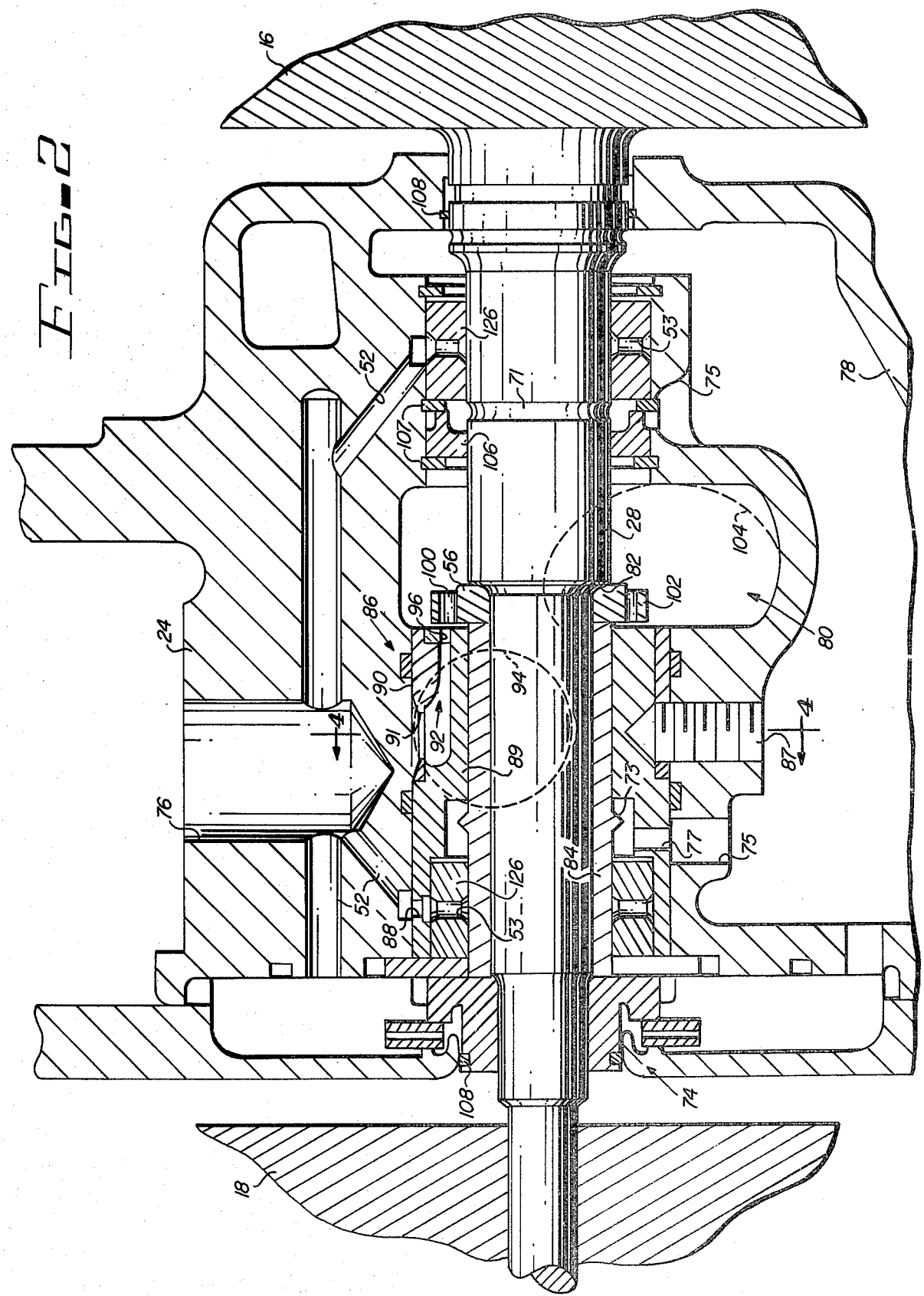
FIG. 2 is a fragmented vertical section of a turbocharger including a nonventilated hydraulic assist turbine.

An hydraulic assist turbocharger system 10 is shown in FIG. 1, and generally comprises a turbocharger 12 for supplying relatively high density charge air to a combustion engine 14, such as a two-cycle or a four-cycle internal combustion engine. More specifically, the turbocharger 12 includes a turbine wheel 16 and a compressor wheel 18 respectively received within turbine and compressor housings 20 and 22. The turbine and compressor housings 20 and 22 are interconnected by a center housing 24 including bearings 26 such as suitable journal and thrust bearings for rotatably supporting a shaft 28 to which the turbine wheel 16 and the compressor wheel 18 are commonly connected.

The turbocharger turbine wheel 16 is rotatably driven by exhaust gases from the engine 14 which are supplied to the turbine wheel via an exhaust manifold 29 and an exhaust conduit 30. If desired, the turbocharger turbine housing 20 and the exhaust manifold 29 and conduit 30 may be adapted for divided, pulse-type operation such as that shown and described in U.S. Pat. No. 3,292,364. The rotating turbine wheel 16 rotatably drives the shaft 28 and the compressor wheel 18, whereby the compressor wheel 18 draws in and compresses ambient air. This compressed ambient air comprises charge or boost air for the engine 14, and is supplied to the intake manifold 32 of the engine via a charge air conduit 34. Conveniently, as shown, a charge air cooler heat exchanger 36 may be provided along the conduit 34 to cool the compressed charge air so as to reduce the total heat load of the engine and to further densify the charge air. The relatively high density charge air thus supplied to the engine 14 enables the engine to operate at a relatively high performance and efficiency level.

The engine 14 includes an hydraulic fluid system 38 which is coupled to provide shared hydraulic fluid to the turbocharger for lubrication of the turbocharger bearings 26. In a preferred embodiment of the invention, the engine hydraulic fluid system 38 comprises an engine oil system, although other types of engine-driven hydraulic systems for other purposes are contemplated. As embodied in an engine oil system as shown in FIG. 1, the hydraulic system 38 includes a reservoir 40 of hydraulic fluid or oil within the engine, and a relatively conventional low pressure oil pump 42 for pumping oil from the reservoir 40 to the engine 14 and the turbocharger 12. More specifically, the oil is pumped through an oil filter 44 and an oil cooler 46, and further to engine components requiring lubrication as indicated by conduit 48. The oil is also coupled through a supply conduit 50 to the center housing 24 of the turbocharger 12 for supply to the turbocharger bearings 26 via a network of internal passages (not shown in FIG. 1) formed in the center housing. The oil passes through the bearings 26, typically as by a gravity-drain system as will be hereafter described, and is returned to the engine oil reservoir 40 as by a return conduit 54. Accordingly, the bearings 26 of the turbocharger 12 share the hydraulic system 38 with the engine 14 to assure that the turbocharger bearings 26 are properly lubricated at all times.

The turbocharger system 10 of this invention includes a nonventilated hydraulic turbine 56 for supplementally driving the turbocharger compressor wheel 18 during certain modes of engine operation. That is, during some conditions of engine operation, the engine exhaust gases are incapable of rotatably driving the turbine wheel 16 at a speed sufficient to drive the compressor wheel 18 to supply the engine 14 with sufficient charge air. For example, such engine operating conditions may include relatively low speed, full load conditions wherein the available energy in the exhaust gases is relatively low, or relatively low speed, acceleration conditions wherein there is insufficient excess charge air available to accommodate rapid transient operating conditions. To assure that the compressor wheel 18 is sufficiently driven to supply the engine with sufficient quantities of charge air, the turbocharger system includes the nonventilated hydraulic turbine 56 for selectively and controllably supplementally driving the compressor wheel 18.

As illustrated in FIG. 1, the nonventilated hydraulic turbine 56 is mounted within the center housing 24 directly upon the turbocharger shaft 28 between the sets of bearings 26 rotatably supporting the shaft. The nonventilated hydraulic turbine 56 is hydraulically driven by high pressure fluid or oil shared from the engine hydraulic system 38. That is, the hydraulic system 38 includes a high pressure pump 58 which may be suitably driven by the engine 14 to provide a source of high pressure fluid. As shown, the high pressure pump 58 has its intake coupled to the engine hydraulic system 38 conveniently at the discharge side of the low pressure pump 42. The high pressure pump 58 supplies high pressure oil to a high pressure supply conduit 60 coupled directly to a control valve 62 which comprises an hydraulic control valve. The control valve 62 is suitably operated to couple the high pressure oil flow to the hydraulic turbine 56 via a line 64, or alternately to return the output of the high pressure pump 58 to the engine hydraulic system 38 to substantially unload the pump 58. As shown, the output of the high pressure pump 58 is returned to the hydraulic system 38 by means of a bypass return conduit 66 coupled to the bearing supply conduit 50. Conveniently, a one-way relief valve 61 is connected between the high pressure supply conduit 60 and the bearing supply conduit 50 to prevent excessive system oil pressures.

The control valve 62 is controlled in response to operating parameters of the turbocharger system 10 to control the operation of the hydraulic turbine 56. As shown, one control scheme for the control valve 62 comprises connection of the valve 62 with the output or discharge pressure of the turbocharger compressor wheel 18 by means of a pressure control line 68. When compressor discharge pressure is at or above a predetermined minimum threshold, the control valve 62 responds to the pressure to return the output of the high pressure pump 58 to the hydraulic system 38 via the bypass return conduit 66. In the event, sufficient oil back pressure corresponding with the discharge pressure of the low pressure pump 42 is available in the turbocharger bearing supply conduit 50 to maintain a relatively small oil flow, say on the order of about one gallon per minute, to the turbocharger bearings 26 for lubrication purposes. This bearing lubrication oil circulates through the center housing 24 in communication with the bearings 26 and then returns to the engine oil system 38 via the main return conduit 54.

When compressor discharge pressure falls below the predetermined threshold value, the control valve 62 automatically in response to the pressure shifts position to couple directly the output of the high pressure pump 58 to the nonventilated hydraulic turbine 56. That is, high pressure oil is fed into the high pressure supply line 64 which couples the oil to the center housing 24 for driving supply to the nonventilated hydraulic turbine 56. The high pressure oil rapidly accelerates the nonventilated hydraulic turbine 56 correspondingly to accelerate rapidly the turbocharger shaft 28. In this manner, the compressor wheel 18 is rapidly accelerated to increase substantially the pressure level of the compressor discharge charge air. This effectively provides the engine 14 with additional or supplemental charge air to maintain the engine 14 in a high power load-carrying state in spite of the inability of the engine exhaust gases to drive adequately the turbocharger turbine wheel 16.

The high pressure oil is circulated through tthe nonventilated hydraulic turbine 56 at a relatively high flow rate and pressure, say on the order of up to about twelve gallons per minute and up to about 1600 p.s.i. This high pressure oil is separated within the center housing 24 from direct communication with air to prevent foaming. The high pressure oil is also maintained separate from the bearing circulation path to prevent flooding of the bearings 26, and to allow the high pressure oil to flow into communication with the hydraulic turbine 56 at a relatively high flow rate. As illustrated in FIG. 1, the oil drains from the nonventilated hydraulic turbine 56 through a one-way check valve 70 and a drain conduit 72 to the turbocharger bearing supply conduit 50. With this configuration, the oil flow returning to the engine hydraulic system 38 via the conduit 50 is maintained at a sufficient back pressure to assure a relatively small flow through the bearing oil supply network within the center housing 24 to maintain bearing lubrication. Of course, the check valve 70 prevents bearing supply flow from communicating with the nonventilated hydraulic turbine 56 when the turbine 56 is not supplementally driven by high pressure oil.

The construction of the turbocharger center housing 24 and the mounting of the nonventilated hydraulic turbine 56 therein is shown in detail in FIGS. 2–8. As shown, the turbocharger center housing 24 is secured between the turbine and compressor wheels 16 and 18, respectively, which in turn are carried within the turbine and compressor housings 20 and 22 (not shown in FIG. 2). The wheels 16 and 18 are fixed upon the shaft 28 which is rotatably carried within the center housing 24 by means of a conventional thrust bearing assembly identified in FIG. 2 by reference numeral 74, and a pair of generally opposed and conventional sleeve-type journal bearings 126. The journal bearings 126 are supplied with relatively low pressure lubricating oil by means of an oil inlet port 76 which is coupled to the bearing supply conduit 50 (not shown in FIG. 2). The oil supplied to the port 76 is guided to the bearings via the internal supply passage network 52, and via holes 53 formed in the bearings 126. From there, the oil drains gravitationally through openings 75 to the bearing oil return lie 54 (not shown in FIG. 2) via a sump 78.

As shown in FIG. 2, the nonventilated hydraulic turbine 56 is centrally carried on the shaft 28 within an enlarged flow chamber 80. More specifically, the nonventilated hydraulic turbine 56 is positioned in axially abutting relation with a shoulder 82 on the shaft 28, and is retained against axial excursions by a positioning sleeve 84 which is in turn retained in position by a thrust collar of the thrust bearing assembly 74. This sleeve 84 is contained concentrically within the left-hand journal bearing 126, which is in turn concentrically contained within a cylindrical high pressure nozzle 86. Conveniently, the nozzle 86 includes holes 88 registering with the bearing oil holes 53 so as to assure adequate lubrication of the left-hand journal bearing 126 as viewed in FIG. 2, as well as a drain opening 77 registering with the adjacent bearing drain opening 75.

The nozzle 86 has a two-part construction in order to guide high pressure oil into driving communication with the nonventilated hydraulic turbine 56. That is, the nozzle 86 includes an inner portion 89 fixed in position by a set screw 87, and which cooperates at one end with an outer portion 90 fixed thereto as by brazing to define a generally semi-circular chamber 92. The chamber 92 communicates via a plurality of flow openings 92 with a high pressure oil inlet port 94 coupled to the high pressure supply conduit 64 (not shown in FIG. 2) for receiving high pressure oil. The high pressure oil, when supplied to the chamber 92, flows through and out of the chamber 92 via a plurality of generally semi-circularly arranged nozzle openings 96. Importantly, these nozzle openings 96 are oriented in a common angular direction with respect to the axis of the shaft 28 so as to impart a circumferentially turning motion to the nonventilated hydraulic turbine 56. That is, as best shown in FIG. 7, the nozzle openings 96 are angled at about 75° or so with respect to the axis of the shaft 28 to direct the high pressure oil circumferentially against the turbine 56 to rotatably drive said turbine.

The nonventilated hydraulic turbine 56 comprises a central disk 98 received over the shaft 28, and a plurality of radially outwardly projecting blades 100. These blades 100, as shown in FIGS. 3, 6, and 8, have a generally cup-shaped or U-shaped configuration presented openly toward the angularly directed oil jets passing from the nozzle openings 96. The blades 100 are, of course, arranged and aligned for direct impingement by the oil jets. Desirably, a circumferential shroud 102 is formed integrally about the radially outer ends of the blades 100 to improve driving coaction between the blades 100 and the oil jets.

In operation, high pressure oil supplied to the nozzle 86 is converted to high pressure oil jets for rapidly accelerating the nonventilated hydraulic turbine 56. The oil driving the turbine 56 substantially immediately floods the center housing flow chamber 80 whereby the hydraulic turbine 56 operates in a nonventilated flooded environment to prevent foaming or frothing of the oil. The oil circulates out of the chamber 80 via an outlet port 104 coupled to the bearing oil supply line 50 (FIG. 1). Importantly, the relative sizes of the inlet and outlet ports 94 and 104, together with the back pressure on the chamber 80 resulting from the presence of low pressure oil in conduit 50, assures substantially immediate flooding of the flow chamber 80 when oil is supplied thereto. Air in the flow chamber 80 is forced by the incoming flooding oil outwardly from the chamber 80 in both directions along the shaft 28. That is, the air is forced between the positioning sleeve 84 and the nozzle 86 for escape through the drain openings 75 and 77, and in the other direction past a divider ring 106 secured in position by retaining rings 107 for escape through the other drain opening 75. During supply of high pressure oil to the nonventilated hydraulic turbine 56, some oil may leak from the flow chamber 80 in both directions along the shaft 28. In this regard, the positioning sleeve 84 includes a slinger 73 aligned with the adjacent drain openings 75 and 77 for radially pumping any such leaking oil through said openings 75 and 77 to the sump 78. Similarly, a slinger contour 71 is formed on the shaft 28 adjacent the divider ring 106 and opposite the flow chamber 80. This slinger contour 71 is aligned with the adjacent drain opening 75, and also functions to pump any leaking oil through the adjacent drain opening 75 to the sump 78. Importantly, both the slinger 73 and the slinger contour 71 are positioned inboard with respect to the journal bearings 126 so as to guard against flooding of said bearings.

When high pressure oil flow to the nonventilated hydraulic turbine 56 ceases, the remaining oil in the flow chamber 80 is rapidly pumped out of the chamber to allow the turbine 56 to freewheel with the turbocharger shaft 28 without significant resistance losses. More specifically, the oil remaining in the chamber 80 is pumped out of the chamber in both directions along the shaft 28 toward the journal bearings 126 by the spinning action of the shaft 28 and the nonventilated hydraulic turbine 56. Conveniently, the slinger 73 and the slinger contour 71 described above operate to prevent the pumped oil from contacting or flooding the turbocharger bearings 126. Accordingly, during all conditions of operation, the turbocharger journal bearings 126 and the thrust bearing assembly 74 are lubricated solely by means of oil supplied via the passage network 52, with seal rings 108 being positioned at opposite ends of the shaft 28 to prevent any oil from leaking into either the turbine housing 20 or the compressor housing 22.

An alternate embodiment of the invention is illustrated schematically in FIG. 9, wherein components identical to those shown and described in FIGS. 1-8 are designated by common reference numerals. In this embodiment, a modified control valve 162 functions optionally to couple the high pressure oil from the high pressure pump 58 through a conduit 109 to an hydraulic motor 110 coupled to drive a fan 112. The high pressure oil thus causes the fan 112 to force large quantities of cooling ambient air across cooling surface areas of a charge air cooler heat exchanger 136, before returning to the bearing supply line 50 via a return conduit 113. With this arrangement, cooling capacity of the charge air heat exchanger 136 is improved over that of the embodiment of FIG. 1 to reduce further the temperature level of the charge air supplied to the engine 14. Conveniently, the need for improved charge air cooling normally arises when large quantities of charge air are supplied to the engine, namely, at relatively high boost levels of turbocharger operation. Therefore, the additional charge air cooling is required primarily when sufficient charge air is available, and is not required when supplemental driving of the turbocharger is needed. Thus, the control valve 162 operates to supply the high pressure oil to the turbocharger 12 under some engine operating conditions for driving the nonventilated hydraulic turbine 56, and to the hydraulic motor 110 for driving the charge air cooling fan 112 during other engine operating conditions.

Various modifications and improvements to the invention set forth herein are believed to be possible within the scope of the art. For example, a variety of control schemes for the control valves 62 and 162 are possible, including electronic systems and the like responsive to one or more engine and/or turbocharger operating parameters. Moreover, the invention is adaptable for use with conventional four-cycle internal combustion engines, or with two-cycle internal combustion engines. With two-cycle engines, the control scheme for the control valves 62 and 162 may be designed so as to supplementally drive the turbocharger in a manner allowing elimination of the conventional scavenging blower. Further, in the embodiment of FIG. 9, the control valve 162 may be adapted also to couple the high pressure oil directly to the bearing supply conduit 50 via the line 66, whereby the control valve 162 is capable of three-position operation to effect (a) driving of the nonventilated hydraulic turbine 56 (b) driving of the fan 112, or (c) unloading of the high pressure oil pump 58. Still further, the nozzle 86 shown particularly in FIGS. 2-7 may be modified to include circumferentially arranged nozzle openings 96. These nozzle openings 96 may be divided into groups for association with two or more chambers 92 which may in turn be coupled to separately controlled, multiple high pressure fluid supply conduits. Accordingly, no limitation of the invention is intended by way of the description herein except as set forth in the appended claims.

What is claimed is:

1. A turbocharger system for supplying charge air to a combustion engine, comprising a turbocharger including a turbine rotatably driven by engine exhaust gases, and a compressor rotatably driven by said turbine for supplying charge air to said engine; an engine hydraulic system including means for supplying hydraulic fluid to said turbocharger for lubrication thereof; an hydraulic turbine coupled directly to said turbocharger; and means for selectively supplying a portion of the fluid from said engine hydraulic system to said hydraulic turbine at a relatively high pressure for rotatably driving said hydraulic turbine for supplementally driving said compressor, said means for supplying fluid to said hydraulic turbine including means to fully submerge said hydraulic turbine during operation thereof.

2. A turbocharger system as set forth in claim 1 wherein said means for supplying fluid to said hydraulic turbine includes a relatively high pressure pump for pumping fluid from said hydraulic system, supply conduit means coupled between said high pressure pump for supplying the pumped fluid into driving communication with said hydraulic turbine, and valve means coupled along said supply conduit means for selectively opening and closing said supply conduit means to fluid flow.

3. A turbocharger system as set forth in claim 2 wherein said valve means is responsive to predetermined turbocharger system parameters for selectively opening said supply conduit means when additional charge air flow is required by the engine, and for closing said supply conduit means when additional charge air flow is not required by the engine.

4. A turbocharger system as set forth in claim 3 wherein said valve means is responsive to the pressure of charge air discharged from said compressor to open said supply conduit means to fluid flow when the pressure of charge air is relatively low, and to close said supply conduit means to fluid flow when the pressure of charge air is relatively high.

5. A turbocharger system as set forth in claim 3 including bypass return conduit means for returning fluid pumped by said high pressure pump to said hydraulic system when additional charge air is not required by the engine to substantially unload said high pressure pump.

6. A turbocharger system as set forth in claim 5 including relief valve means coupled between said supply conduit means and said bypass return conduit means for preventing excessive pressure levels along said supply conduit means.

7. A turbocharger system as set forth in claim 5 including a charge air heat exchanger coupled between said compressor and the engine for cooling passage of the charge air prior to supply thereof to the engine.

8. A turbocharger system as set forth in claim 7 including a fan for forcing ambient air through said heat exchanger in heat exchange relation with the charge air passing through said heat exchanger, and an hydraulic motor for rotatably driving said fan; said valve means being coupled to said hydraulic motor for selectively circulating relatively high pressure fluid therethrough for driving said motor, and selectively operable to couple the high pressure fluid to one of said hydraulic turbine, said bypass return conduit means, and said hydraulic motor.

9. A turbocharger system as set forth in claim 1 wherein said turbocharger comprises a turbine having a turbine wheel carried within a turbine housing, said compressor having a compressor wheel carried within a compressor housing, a common shaft connected between said turbine and compressor wheels, and a center housing connected between said turbine and compressor housings and including bearing means for rotatably supporting said shaft, said hydraulic system including a bearing supply conduit for supplying relatively low pressure fluid for lubrication of said bearing means, and a bearing return conduit for returning the low pressure fluid from said bearing means to said hydraulic system.

10. A turbocharger system as set forth in claim 9 wherein said center housing includes a turbine flow chamber, said hydraulic turbine being mounted on said shaft within said flow chamber, and nozzle means for directing high pressure fluid into driving communication with said hydraulic turbine.

11. A turbocharger system for supplying charge air to a combustion engine, comprising a turbocharger including a turbine rotatably driven by engine exhaust gases, and a compressor rotatably driven by said turbine for supplying charge air to said engine; an engine hydraulic system including means for supplying hydraulic fluid to said turbocharger for lubrication thereof; an hydraulic turbine coupled directly to said turbocharger; and means for selectively supplying a portion of the fluid from said hydraulic system to said hydraulic turbine at a relatively high pressure for rotatably driving said hydraulic turbine for supplementally driving said compressor; said hydraulic system comprising an oil reservoir; a relatively low pressure pump for pumping oil from said reservoir; first means for circulating low pressure oil from said low pressure pump to the engine for lubrication thereof, and to return the oil to said reservoir; and second means for circulating low pressure oil from said low pressure pump to the turbocharger for lubrication thereof, and to return the oil to said reservoir; and said high pressure lubricant supply means comprising a relatively high pressure pump for pumping oil from said hydraulic system at a relatively high pressure, a supply conduit coupled between said high pressure pump and said hydraulic turbine for supplying high pressure oil into driving communication with said hydraulic turbine, valve means for selectively opening and closing said supply conduit to oil flow, and a return conduit coupled between said hydraulic turbine and said second means.

12. A turbocharger system as set forth in claim 11 wherein said return conduit is coupled to said second means upstream of said turbocharger.

13. A turbocharger system as set forth in claim 11 including a check valve for preventing flow of oil from said second means into said return conduit.

14. A turbocharger system as set forth in claim 11 wherein said high pressure pump has its intake coupled to the output of said low pressure pump.

15. A turbocharger system as set forth in claim 11 including a bypass return conduit coupled between said valve means and said second means, said valve means being operable to couple the output of said high pressure pump to said hydraulic system without driving said hydraulic turbine when additional charge air is not required by the engine.

16. A turbocharger system for supplying charge air to a combustion engine, comprising a turbocharger including a turbine having a turbine wheel carried within a turbine housing and rotatably driven by engine exhaust gases, and a compressor having a compressor wheel carried within a compressor housing and rotatably driven by said turbine for supplying charge air to said engine, a common shaft connected between said turbine and compressor wheels, and a center housing connected between said turbine and compressor housings and including a turbine flow chamber and bearing means for rotatably supporting said shaft; an engine hydraulic system including means for supplying hydraulic fluid to said turbocharger for lubrication thereof, a bearing supply conduit for supplying relatively low pressure fluid for lubrication of said bearing means, and a bearing return conduit for returning the low pressure fluid from said bearing means to said hydraulic system; an hydraulic turbine being mounted on said shaft within said flow chamber and coupled directly to said turbocharger; and means for selectively supplying a portion of the fluid from said hydraulic system to said hydraulic turbine at a relatively high pressure for rotatably driving said hydraulic turbine for supplementally driving said compressor, including nozzle means for directing high pressure fluid into driving communication with said hydraulic turbine, said nozzle means comprising a generally cylindrical member carried about said shaft, said cylindrical member including a nozzle chamber for receiving high pressure fluid, and a plurality of relatively small nozzle openings communicating between said nozzle chamber and said hydraulic turbine whereby the high pressure fluid is directed as high pressure jets through said nozzle openings into driving communication with said hydraulic turbine.

17. A turbocharger system as set forth in claim 16 wherein said nozzle openings are uniformly formed angularly with respect to the axis of said shaft so as to impart a circumferential turning motion to said hydraulic turbine.

18. A turbocharger system as set forth in claim 17 wherein said nozzle openings are each angled at about 75° with respect to the axis of said shaft.

19. A turbocharger system as set forth in claim 17 wherein said hydraulic turbine comprises a central disk mounted on said shaft and having a plurality of radially outwardly extending generally U-shaped blades, said blades being aligned radially with said nozzle openings and oriented openly toward the angularly disposed high pressure jets directed through said nozzle openings.

20. A turbocharger system as set forth in claim 19 wherein said hydraulic turbine further includes a shroud circumferentially surrounding said blades.

21. A turbocharger system for supplying charge air to a combustion engine, comprising a turbocharger including a turbine having a turbine wheel carried within a turbine housing and rotatably driven by engine exhaust gases, a compressor having a compressor wheel carried within a compressor housing and rotatably driven by said turbine for supplying charge air to said engine, a common shaft connected between said turbine and compressor wheels, a center housing connected between said turbine and compressor housings and including a turbine flow chamber having an inlet port and an outlet port for passage of high presure lubricant therethrough, and bearing means for rotatably supporting said shaft; an engine hydraulic system including means for supplying hydraulic fluid to said turbocharger for lubrication thereof, a bearing supply conduit for supplying relatively low pressure fluid for lubrication of said bearing means, and a bearing return conduit for returning the low pressure fluid from said bearing means to said hydraulic system; an hydraulic turbine being mounted on said shaft within said flow chamber and coupled directly to said turbocharger; and means for selectively supplying a portion of the fluid from said hydraulic system to said hydraulic turbine at a relatively high pressure for rotatably driving said hydraulic turbine for supplementally driving said compressor, including nozzle means for directing high pressure fluid into driving communication with said hydraulic turbine, said means for supplying fluid to said hydraulic turbine comprising a relatively high pressure pump for pumping fluid from said hydraulic system, and supply conduit means for supplying the high pressure pumped fluid to said hydraulic turbine, said supply conduit means coupled to the inlet port of said turbine flow chamber and said bearing supply conduit coupled to the outlet port of said turbine flow chamber so as to apply a back pressure to said flow chamber to cause substantially immediate flooding of said flow chamber with fluid when high pressure fluid is supplied to drive said hydraulic turbine, whereby said hydraulic turbine operates in a nonventilated environment.

22. A turbocharger system as set forth in claim 21 including means on said shaft for relieving air from said flow chamber when high pressure fluid is supplied thereto and for pumping the fluid from said flow chamber when supply of the fluid to said flow chamber ceases.

23. A turbocharger system as set forth in claim 22 wherein said bearing means comprises at least two bearings mounted on said shaft generally in opposition to each other with said flow chamber and said hydraulic turbine disposed generally centrally with respect to said shaft and between said bearings.

24. A turbocharger system as set forth in claim 23 wherein said pumping means on said shaft includes first and second slinger means disposed respectively on opposite sides of said flow chamber and inboard with respect to said bearings, whereby said slinger means also pumps away from said bearings any fluid leaking down said shaft when said fluid is supplied to said flow chamber to prevent flooding of said bearings.

25. A turbocharger system for supplying charge air to a combustion engine, comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; an hydraulic system including a relatively low pressure pump and first conduit means for circulating a lubricant fluid at relatively low pressure to said bearing means for lubrication thereof; an hydraulic turbine mounted on said shaft and disposed within a turbine flow chamber formed in said center housing; means including a relatively high pressure pump and second conduit means for circulating a portion of the fluid at relatively high pressure from said hydraulic system to said hydraulic turbine for rotatably driving said hydraulic turbine in fully submerged operation for supplementally driving said compressor wheel; and valve means coupled along said second conduit means for selectively opening and closing said second conduit means to fluid flow.

26. A turbocharger system as set forth in claim 25 wherein said valve means is responsive to predetermined turbocharger system parameters for selectively opening said second conduit means when additional charge air flow is required by the engine, and for closing said second conduit means when additional charge air flow is not required by the engine.

27. A turbocharger system as set forth in claim 26 including bypass return conduit means coupled between said valve means and said hydraulic system, said valve means being operable to return fluid pumped by said high pressure pump to said hydraulic system via said bypass return conduit means prior to driving communication with said hydraulic turbine when additional charge air is not required by the engine.

28. A turbocharger system as set forth in claim 27 wherein said bypass return conduit means is coupled between said valve means and said first conduit means.

29. A turbocharger system for supplying charge air to a combustion engine, comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; an hydraulic system including a relatively low pressure pump and first conduit means for circulating a lubricant fluid at relatively low pressure to said bearing means for lubrication thereof, said first conduit means comprising a bearing supply conduit for supplying fluid to said bearing means and a bearing return conduit for returning fluid from said bearing means to said supply system; an hydraulic turbine mounted on said shaft and disposed within a turbine flow chamber formed in said center housing; means including a relatively high pressure pump and second conduit means for circulating a portion of the fluid at relatively high pressure from said hydraulic system to said hydraulic turbine for rotatably driving said hydraulic turbine for supplementally driving said compressor wheel, said second conduit means comprising a high pressure supply conduit for supplying high pressure fluid to said hydraulic turbine; valve means coupled along said second conduit means for selectively opening and closing said second conduit means to fluid flow, said valve means being disposed along said high pressure supply conduit and responsive to predetermined turbocharger system parameters for selectively opening said second conduit means when additional charge air flow is required by the engine, and for closing said second conduit means when additional charge air flow is not required by the engine; and return conduit means coupled to said bearing supply conduit for returning fluid passing through said flow chamber to said hydraulic system, said return conduit means including a check valve for preventing fluid flow from said bearing supply conduit into communication with said hydraulic turbine.

30. A turbocharger system as set forth in claim 29 wherein said center housing includes an inlet port coupled to said high pressure supply circuit, and an outlet port coupled to said return conduit means so as to apply a back pressure to said flow chamber to cause substantially immediate flooding of said flow chamber when high pressure fluid is supplied thereto whereby said hydraulic turbine operates in a substantially nonventilated environment.

31. A turbocharger system as set forth in claim 30 including means on said shaft for relieving air from said flow chamber when high pressure fluid is supplied thereto and for pumping fluid from said flow chamber when supply of fluid thereto ceases.

32. A turbocharger system as set forth in claim 30 wherein said bearing means comprises at least two bearings mounted on said shaft generally in opposition to each other with said flow chamber and said hydraulic turbine disposed generally centrally therebetween.

33. A turbocharger system as set forth in claim 31 wherein said relieving and pumping means on said shaft includes first and second slinger means disposed respectively on opposite sides of said flow chamber and inboard with respect to said bearings, whereby said slinger means also pumps away from said bearing any fluid leaking down said shaft when said fluid is supplied to said flow chamber to prevent flooding of said bearings.

34. A turbocharger system as set forth in claim 24 or 33 including means for coupling fluid pumped by said slinger means to said bearing return conduit.

35. A turbocharger system as set forth in claim 30 including nozzle means carried within said center housing and communicating with said high pressure inlet port, said nozzle means including means for converting high pressure fluid to a plurality of high pressure jets in driving communication with said hydraulic turbine.

36. A turbocharger system for supplying charge air to a combustion engine, comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; an hydraulic system for supplying lubricant fluid to the engine and said bearing means for lubrication thereof, said hydraulic system including a relatively low pressure pump, a bearing supply conduit for supplying fluid from said low pressure pump to said bearing means, and a bearing return conduit for returning fluid from said bearing means to said hydraulic system; an hydraulic turbine mounted on said shaft and disposed within a turbine flow chamber formed in said center housing; nozzle means mounted within said center housing; a relatively high pressure pump for pumping a portion of the fluid at relatively high pressure from said hydraulic system; a high pressure supply conduit for coupling high pressure fluid to said nozzle means, said nozzle means including a plurality of nozzle openings oriented for passage of a plurality of relatively high pressure jets of fluid for drivingly rotating said hydraulic turbine; return conduit means for coupling fluid passing through said flow chamber to said bearing supply conduit, said return conduit means including a check valve for preventing flow from said bearing supply conduit into driving communication with said hydraulic turbine; a control valve coupled along said high pressure supply conduit for selectively opening said high pressure supply conduit to fluid flow when additional charge air is required by the engine, and for selectively closing said high pressure supply conduit to fluid flow when additional charge air is not required by the engine; and a bypass return conduit coupled between said control valve and said bearing supply conduit, said control valve being operable to return the output of said high pressure pump to said hydraulic system via said bearing supply conduit when said high pressure supply conduit is closed.

37. A turbocharger system as set forth in claim 25 or 36 including a charge air heat exchanger for cooling passage of charge air prior to supply to the engine, a fan for forcing ambient air through said heat exchanger in heat transfer relation with the charge air, an hydraulic motor for rotatably driving said fan, and means coupled between said valve means and said hydraulic motor for selectively circulating high pressure fluid to said motor for driving thereof.

38. A turbocharger system as set forth in claim 36 wherein said center housing includes an inlet port coupled to said high pressure supply conduit, and an outlet port coupled to said return conduit means so as to apply a back pressure to said flow chamber to cause substantially immediate flooding of said turbine flow chamber when high pressure fluid is supplied thereto whereby said hydraulic turbine operates in a substantially nonventilated environment.

39. A turbocharger system as set forth in claim 38 including means on said shaft for relieving air from said flow chamber when high pressure fluid is supplied thereto and for pumping fluid from said flow chamber when supply of fluid thereto ceases.

40. A turbocharger system as set forth in claim 36 wherein the intake of said high pressure pump is coupled to the output of said low pressure pump.

41. A turbocharger system for supplying charge air to a combustion engine, comprising a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; an hydraulic system for supplying lubricant fluid to the engine and said bearing means for lubrication thereof, said hydraulic system including a relatively low pressure pump, a bearing supply conduit for supplying fluid from said low pressure pump to said bearing means, and a bearing return conduit for returning fluid from said bearing means to said hydraulic system; an hydraulic turbine mounted on said shaft and disposed within a turbine flow chamber formed in said center housing; nozzle means mounted within said center housing; a relatively high pressure pump having its intake coupled to the output of said low pressure pump for pumping fluid at relatively high pressure from said hydraulic system, said center housing including an inlet port and an outlet port communicating with said turbine flow chamber; a high pressure supply conduit for coupling high pressure lubricant flow to said nozzle means via said inlet port, said nozzle means including a plurality of nozzle openings oriented for passage of a plurality of relatively high pressure jets of fluid for drivingly rotating said hydraulic turbine; return conduit means for coupling fluid passing through said flow chamber via said outlet port to said bearing supply conduit, said return conduit means including a check valve for preventing flow from said bearing supply conduit into driving communication with said hydraulic turbine; a control valve coupled along said high pressure supply conduit for selectively opening said high pressure supply conduit to fluid flow when additional charge air is required by the engine, and for selectively closing said high pressure supply conduit to flow when additional charge air is not required by the engine; a bypass return conduit coupled between said control valve and said bearing supply conduit, said control valve being operable to return the output of said high pressure pump to said hydraulic system via said bearing supply conduit when said high pressure supply conduit is closed to substantially unload said high pressure pump; and means on said shaft for relieving air from said flow chamber when high pressure fluid is supplied thereto and for pumping fluid from said flow chamber when fluid flow thereto ceases.

42. A turbocharger engine system comprising a combustion engine; a turbocharger including a turbine wheel rotatably driven by engine exhaust gases, a compressor wheel mounted on a shaft common with said turbine wheel and rotatably driven thereby for supplying charge air to the engine, and bearing means mounted within a turbocharger center housing for rotatably supporting said shaft; a charge air heat exchanger for cooling passage of charge air prior to supply thereof to said engine; a fan for forcing ambient air through said heat exchanger in heat transfer relation with the charge air; an hydraulic motor for rotatably driving said fan; an hydraulic system including a relatively low pressure pump and first conduit means for circulating lubricant fluid at relatively low pressure to the engine and said bearing means for lubrication thereof; an hydraulic turbine mounted on said shaft and disposed within a turbine flow chamber formed in said center housing; means including a relatively high pressure pump and second conduit means for circulating a portion of the fluid at relatively high pressure from said hydraulic system to said hydraulic turbine for rotatably driving said hydraulic turbine for supplementally driving said compressor wheel; valve means coupled along said second conduit means for selectively opening said second conduit means to fluid flow when additional charge air is required by the engine, and for selectively closing said second conduit means to fluid flow when additional charge air is not required by the engine; and means coupled between said valve means and said hydraulic motor for circulation of a portion of the high pressure fluid to said motor for driving thereof, said valve means being selectively operable to couple high pressure fluid to said motor when said second conduit means is closed.

43. A turbocharger engine system as set forth in claim 42 including bypass return conduit means coupled between said valve means and said hydraulic system, said valve means being selectively operable to couple high pressure fluid to one of said hydraulic turbine, said hydraulic motor, and said hydraulic system via said bypass return conduit means.

44. A turbocharger engine system as set forth in claim 43 wherein said bypass return conduit means is coupled between said valve means and said first conduit means.

45. A turbocharger engine system as set forth in claim 43 wherein said second conduit means comprises supply conduit means for supplying high pressure fluid to said hydraulic turbine, and including said valve means; and return conduit means coupled between said hydraulic turbine and said first conduit means.

46. A turbocharger for supplying charge air to a combustion engine, comprising an engine exhaust gas driven turbine including a turbine wheel carried within a turbine housing; a compressor for supplying engine charge air including a compressor wheel carried within a compressor housing; a center housing coupled between said turbine and compressor housing; a common shaft connected between said turbine and compressor wheels whereby said compressor wheel is rotatably driven by said turbine wheel; bearing means carried within said center housing for rotatably supporting said shaft; an hydraulic turbine mounted on said shaft within a turbine flow chamber formed in said center housing; and means for selectively supplying a fluid at a relatively high pressure to said center housing for rotatably driving said hydraulic turbine for supplementally driving said compressor wheel, said means for supplying fluid to said hydraulic turbine including means to fully submerge said hydraulic turbine during operation thereof.

47. A turbocharger as set forth in claim 46 wherein said fluid supply means includes a reservoir of fluid, a relatively high pressure pump for pumping fluid from said reservoir, conduit means for circulating said fluid through said flow chamber in said center housing, and valve means for selectively opening and closing said conduit means to fluid flow.

48. A turbocharger as set forth in claim 47 wherein the engine includes an hydraulic system including means for supplying lubricant fluid at relatively low pressure to said bearing means for lubrication thereof, said high pressure pump being for pumping fluid from said hydraulic system.

49. A turbocharger as set forth in claim 46 including nozzle means mounted within said center housing for receiving high pressure fluid, and for directing said fluid into driving communication with said hydraulic turbine.

50. A turbocharger for supplying charge air to a combustion engine, comprising an engine exhaust gas driven turbine including a turbine wheel carried within a turbine housing; a compressor for supplying engine charge air including a compressor wheel carried within a compressor housing; a center housing coupled between said turbine and compressor housings; a common shaft connected between said turbine and compressor wheels whereby said compressor wheel is rotatably driven by said turbine wheel; bearing means carried within said center housing for rotatably supporting said shaft; an hydraulic system including means for supplying lubricant fluid at relatively low pressure to said bearing means for lubrication thereof; an hydraulic turbine mounted on said shaft within a turbine flow chamber formed in said center housing; and means for selectively supplying a fluid at a relatively high pressure to said center housing for rotatably driving said hydraulic turbine for supplementally driving said compressor wheel, said center housing including an inlet port and an outlet port communicating with said flow chamber for passage of high pressure fluid therethrough, said outlet port being coupled to said means for supplying low pressure fluid to said bearing means so as to apply a back pressure to said flow chamber to cause substantially immediate flooding of said flow chamber when fluid is supplied thereto whereby said hydraulic turbine operates in a substantially nonventilated environment.

51. A turbocharger as set forth in claim 50 including means for relieving air from said flow chamber when high pressure fluid is supplied thereto and for pumping fluid from said flow chamber when fluid flow thereto ceases.

52. A turbocharger as set forth in claim 49 wherein said bearing means comprises at least two bearings generally in opposition to each other with said flow chamber and hydraulic turbine therebetween.

53. A turbocharger as set forth in claim 52 wherein said relieving and pumping means comprises first and second slinger means respectively on opposite sides of said flow chamber and inboard with respect to said bearings.

54. A turbocharger for supplying charge air to a combustion engine, comprising an engine exhaust gas driven turbine including a turbine wheel carried within a turbine housing; a compressor for supplying engine charge air including a compressor wheel carried within a compressor housing; a center housing coupled between said turbine and compressor housings; a common shaft connected between said turbine and compressor wheels whereby said compressor wheel is rotatably driven by said turbine wheel; bearing means carried within said center housing for rotatably supporting said shaft; an hydraulic turbine mounted on said shaft within a turbine flow chamber formed in said center housing; means for selectively supplying a fluid at a relatively high pressure to said center housing for rotatably driving said hydraulic turbine for supplementary driving said compressor wheel; and nozzle means mounted within said center housing for receiving high pressure fluid and for directing said fluid into driving communication with said hydraulic turbine, said nozzle means comprising a generally cylindrical member carried about said shaft, said cylindrical member including a nozzle chamber for receiving high pressure fluid, and a plurality of relatively small nozzle openings communicating between said nozzle chamber and said hydraulic turbine whereby the high pressure fluid is converted to a plurality of high pressure jets passing through said nozzle openings into driving communication with said hydraulic turbine.

55. A turbocharger as set forth in claim 54 wherein said nozzle openings are uniformly formed angularly with respect to the axis of rotation of said shaft so as to impart a circumferential turning motion to said hydraulic turbine.

56. A turbocharger as set forth in claim 55 wherein said hydraulic turbine comprises a central disk having a plurality of radially outwardly extending generally U-shaped blades, said blades being aligned radially with said nozzle openings and oriented openly toward the high pressure jets from said nozzle openings.

57. A turbocharger as set forth in claim 56 wherein said hydraulic turbine further includes a shroud circumferentially surrounding said blades.

58. A turbocharger for supplying charge air to a combustion engine, comprising an engine exhaust gas driven turbine including a turbine wheel carried within a turbine housing; a compressor for supplying engine charge air including a compressor wheel carried within a compressor housing; a center housing coupled between said turbine and compressor housings; a common shaft connected between said turbine and compressor wheels whereby said compressor wheel is rotatably driven by said turbine wheel; bearing means carried within said center housing for rotatably supporting said shaft; an hydraulic turbine mounted on said shaft within a turbine flow chamber formed in said center housing; an inlet port on said center housing for receiving a relatively high pressure fluid; nozzle means communicating with said inlet port for directing high pressure fluid into rotatable driving communication with said hydraulic turbine for supplementally driving said compressor wheel; an outlet port on said center housing forming a discharge path for high pressure fluid from said flow chamber; means coupled to said outlet port for applying a fluid back pressure to said flow chamber to cause substantially immediate flooding of said flow chamber when high pressure fluid is supplied thereto whereby said hydraulic turbine operates in a substantially nonventilated environment; valve means for selectively supplying high pressure fluid to said inlet port; and means for relieving air from said flow chamber when high pressure fluid is supplied thereto and for pumping fluid from said flow chamber when supply of fluid thereto ceases.

59. A turbocharger as set forth in claim 58 wherein said bearing means comprises at least two bearings on said shaft generally in opposition to each other on opposite sides of said flow chamber, said relieving and pumping means including first and second slinger means on opposite sides of said flow chamber and inboard with respect to said bearings.

60. A turbocharger for supplying charge air to a combustion engine including an hydraulic lubricant fluid system for supplying lubricant fluid at relatively low pressure to the engine and the turbocharger, comprising an engine exhaust gas driven turbine including a turbine wheel carried within a turbine housing; a compressor for supplying engine charge air including a compressor wheel carried within a compressor housing; a center housing coupled between said turbine and compressor housings; a common shaft connected between said turbine and compressor wheels whereby said compressor wheel is rotatably driven by said turbine wheel; bearing means carried within said center housing for rotatably supporting said shaft, said center housing including lubricant supply passages for coupling said bearing means with the hydraulic system for lubrication of said bearing means; an hydraulic turbine mounted on said shaft within a turbine flow chamber formed in said center housing; and means for selectively supplying a portion of the fluid from the supply system at a relatively high pressure to said center housing for rotatably driving said hydraulic turbine in fully submerged condition for supplementally driving said compressor wheel.

61. In a turbocharger system including a turbocharger having an exhaust gas driven turbine for rotatably driving a compressor for supplying charge air to a combustion engine, and an hydraulic system including means for supplying hydraulic fluid at relatively low pressure to the turbocharger for lubrication thereof, a method of supplementally driving the turbocharger compressor comprising the steps of mounting an hydraulic turbine directly on the turbocharger; and selectively supplying a portion of the fluid at a relatively high pressure to the hydraulic turbine from the hydraulic system for rotatably driving fully submerged the hydraulic turbine and thereby supplementally driving the compressor.

62. The method of claim 61 wherein said step of supplying fluid to the hydraulic turbine comprises pumping the fluid from the hydraulic system with a relatively high pressure pump, coupling the high pressure fluid into driving communication with the hydraulic turbine via supply conduit means, and selectively opening and closing the supply conduit means with valve means.

63. The method of claim 62 including coupling the intake of the high pressure pump to the low pressure fluid.

64. The method of claim 62 including opening the supply conduit means to fluid flow when the additional charge air is required by the engine, and closing the supply conduit means to fluid flow when additional charge air is not required by the engine.

65. The method of claim 64 including returning the output of the high pressure pump to the hydraulic system via a bypass return conduit means without drivingly communicating with the hydraulic turbine when additional charge air is not required by the engine to substantially unload the high pressure pump.

66. The method of claim 65 wherein the hydraulic system includes a supply conduit for supplying low pressure fluid to the turbocharger for lubrication thereof, and said returning step includes coupling the bypass return conduit means between said valve means and said supply conduit.

67. The method of claim 66 wherein the hydraulic system comprises an engine lubrication system for circulating low pressure lubricant fluid to the engine and the turbocharger for lubrication thereof.

68. The method of claim 61 wherein the turbocharger includes a center housing with bearing means for rotatably supporting a shaft commonly connected to said turbine and compressor, said mounting step including mounting the hydraulic turbine on the shaft within a turbine flow chamber formed in the center housing.

69. The method of claim 68 including mounting nozzle means within the center housing, and directing high pressure fluid flow through the nozzle means into driving communication with the hydraulic turbine.

70. The method of claim 68 including applying a predetermined back pressure to the turbine flow chamber so that the flow chamber substantially immediately floods upon supply of high pressure fluid thereto whereby said hydraulic turbine operates in a substantially nonventilated environment.

71. In a turbocharger system including a turbocharger having an exhaust gas driven turbine for rotatably driving a compressor for supplying charge air to a combustion engine, a center housing with bearing means for rotatably supporting a shaft commonly connected to said turbine and compressor, and an hydraulic system including means for supplying hydraulic fluid at relatively low pressure to the turbocharger for lubrication thereof, a method of supplementally driving the turbocharger compressor comprising the steps of mounting an hydraulic turbine directly on the turbocharger on the shaft within a turbine flow chamber formed in the center housing; selectively supplying a portion of the fluid at a relatively high pressure to the hydraulic turbine from the hydraulic system for rotatably driving the hydraulic turbine and thereby supplementally drive the compressor; and applying a predetermined back pressure to the turbine flow chamber so that the flow chamber substantially immediately floods upon supply of high pressure fluid thereto whereby said hydraulic turbine operates in a substantially nonventilated environment, said applying step comprising coupling fluid outflow from the turbine flow chamber to said means for supplying low pressure fluid to the turbocharger for lubriation, and including preventing flow of low pressure fluid to said flow chamber with check valve means.

72. In a turbocharger system including a turbocharger having an exhaust gas driven turbine for rotatably driving a compressor for supplying charge air to a combustion engine, a center housing with bearing means for rotatably supporting a shaft commonly connected to said turbine and compressor, and an hydraulic system including means for supplying hydraulic fluid at relatively low pressure to the turbocharger for lubrication thereof, a method of supplementally driving the turbocharger compressor comprising the steps of mounting an hydraulic turbine directly on the turbocharger on the shaft within a turbine flow chamber formed in the center housing; selectively supplying a portion of the fluid at a relatively high pressure to the hydraulic turbine from the hydraulic system for rotatably driving the hydraulic turbine and thereby suplementally drive the compressor; applying a predetermined back pressure to the turbine flow chamber so that the flow chamber substantially immediately floods upon supply of high pressure fluid thereto whereby said hydraulic turbine operates in a substantially nonventilated environment, relieving, with relieving means on the shaft, air from the flow chamber when high pressure fluid is supplied thereto; and pumping, with pumping means on the shaft, fluid from the flow chamber when supply of high pressure fluid thereto ceases.

73. In a turbocharger system including a turbocharger having an exhaust gas driven turbine for rotatably driving a compressor for supplying charge air to a combustion engine, and an hydraulic system including means for supplying relatively low pressure fluid to the engine and the turbocharger for lubrication thereof, a method of supplementally driving the turbocharger compressor comprising the steps of mounting an hydraulic turbine directly on the turbocharger; and selectively supplying fluid at a relatively high pressure to the hydraulic turbine from the hydraulic system for rotatably driving the hydraulic turbine in a fully submerged condition and thereby supplementally drive the compressor, said supplying step including pumping the fluid from the hydraulic system with a relatively high pressure pump, coupling the high pressure fluid into driving communication with the hydraulic turbine via supply conduit means, and selectively opening and closing the supply conduit means with valve means responsive to engine air flow requirements.

74. The method of claim 73 including coupling the intake of the high pressure pump to the low pressure fluid.

75. In a turbocharger system including a turbocharger having an exhaust gas driven turbine for rotatably driving a compressor for supplying charge air to a combustion engine, and an hydraulic system including means for supplying relatively low pressure fluid to the engine and the turbocharger for lubrication thereof, a method of supplementally driving the turbocharger compressor comprising the steps of mounting an hydraulic turbine directly on the turbocharger; and selectively supplying fluid at a relatively high pressure to the hydraulic turbine from the hydraulic system for rotatably driving the hydraulic turbine and thereby supplementally drive the compressor, said supplying step including pumping the fluid from the hydraulic system with a relatively high pressure pump, coupling the high pressure fluid into driving communication with the hydraulic turbine via supply conduit means, selectively opening and closing the supply conduit means with valve means responsive to engine air flow requirements, coupling the intake of the high pressure pump to the low pressure fluid, and returning the output of the high pressure pump to the hydraulic system via bypass return conduit means coupled to the low pressure fluid when additional air flow is not required by the engine to substantially unload the high pressure pump.

76. The method of claim 64 or 73 wherein the turbocharger system includes a charge air heat exchanger for cooling charge air prior to supply thereof to the engine, and including the steps of forcing with a fan ambient air into heat exchange communication with charge air passing through the heat exchanger, driving the fan with an hydraulic motor, coupling the hydraulic motor to the valve means, and selectively supplying high pressure fluid from the valve means to drive the hydraulic motor when additional charge air is not required by the engine.

77. In a turbocharger system including a turbocharger having an exhaust gas driven turbine for rotatably driving a compressor for supplying charge air to a combustion engine, and an hydraulic system including means for supplying relatively low pressure fluid to the turbocharger for lubrication thereof, a method of supplementally driving the turbocharger compressor comprising the steps of mounting an hydraulic turbine directly on the turbocharger; passing the charge air through a charge air heat exchanger prior to supply thereof to the engine; providing a fan for forcing ambient air into heat exchange relation with the charge air passing through the heat exchanger; providing an hydraulic motor for driving said fan; selectively supplying a portion of the fluid at a relatively high pressure from the hydraulic system to drive the hydraulic motor in response to engine air requirements; and selectively supplying a portion of the fluid at a relatively high pressure from the hydraulic system to drive the hydraulic turbine in a fully submerged condition and thereby supplementally drive the compressor in response to engine air requirements.

78. The method of claim 77 including the step of selectively returning high pressure fluid to said hydraulic system without driving the hydraulic motor or the hydraulic turbine during some conditions of engine operation.

79. In turbocharger system including a turbocharger having an exhaust gas driven turbine for rotatably driving a compressor for supplying charge air to a combustion engine, an hydraulic system for lubrication of the combustion engine, and an hydraulic turbine mounted directly on the turbocharger, a method of operating the turbocharger comprising the steps of supplying hydraulic fluid from the hydraulic system at relatively low pressure to the turbocharger for lubrication thereof, and selectively supplying a portion of the hydraulic fluid at a relatively high pressure to the hydraulic turbine to rotatably drive the hydraulic turbine in a substantially fully submerged environment and thereby supplementally drive the compressor.

80. The method of claim 79 wherein said step of supplying fluid to the hydraulic turbine comprises pumping the fluid from the hydraulic system with a relatively high pressure pump, directing the high pressure fluid into driving communication with the hydraulic turbine via supply conduit means, and selectively opening and closing the supply conduit means with valve means.

81. The method of claim 80 including opening the supply conduit means to fluid flow when the additional charge air is required by the engine, and closing the supply conduit means to fluid flow when additional charge air is not required by the engine.

82. The method of claim 81 including returning the output of the high pressure pump to the hydraulic system via a bypass return conduit means without drivingly communicating with the hydraulic turbine when additional charge air is not required by the engine to substantially unload the high pressure pump.

83. The method of claim 79 wherein the turbocharger includes a center housing with bearing means for rotatably supporting a shaft commonly connected to said turbine and compressor and the hydraulic turbine is mounted on the shaft within a turbine flow chamber formed in the center housing.

84. The method of claim 83 wherein the center housing includes nozzle means therein and the high pressure fluid flow is directed through the nozzle means into driving communication with the hydraulic turbine.

85. The method of claim 83 including applying a predetermined back pressure to the turbine flow chamber so that the flow chamber substantially immediately floods upon supply of high pressure fluid thereto.

86. The method of claim 85 including relieving air from the flow chamber when high pressure fluid is supplied thereto, and pumping fluid from the flow chamber when supply of high pressure fluid thereto ceases.

87. In a turbocharger system including a turbocharger having an exhaust gas driven turbine for rotatably driving a compressor for supplying charge air to a combustion engine, an hydraulic system including means for supplying relatively low pressure fluid to the engine and the turbocharger for lubrication thereof, and an hydraulic turbine mounted directly on the turbocharger, a method of operating the turbocharger comprising the steps of selectively supplying fluid at a relatively high pressure to the hydraulic turbine from the hydraulic system for rotatably driving the hydraulic turbine in a fully submerged environment and thereby supplementally drive the compressor, said supplying step including pumping the fluid from the hydraulic system with a relatively high pressure pump, directing the high pressure fluid into driving communication with the hydraulic turbine via supply conduit means, and selectively opening and closing the supply conduit means with valve means responsive to engine air flow requirements.

88. The method of claim 81 or 87 wherein the turbocharger system includes a charge air heat exchanger for cooling charge air prior to supplly thereof to the engine, and including the steps of forcing with a fan ambient air into heat exchange communication with charge air passing through the heat exchanger, driving the fan with an hydraulic motor coupled to the valve means, and selectively supplying high pressure fluid from the valve means to drive the hydraulic motor when additional charge air is not required by the engine.

* * * * *